(12) United States Patent
Dietz et al.

(10) Patent No.: US 12,467,733 B2
(45) Date of Patent: Nov. 11, 2025

(54) CHROMATIC CONFOCAL MEASURING DEVICE

(71) Applicant: Precitec Optronik GmbH, Neu-Isenburg (DE)

(72) Inventors: Christoph Dietz, Obertshausen (DE); Philipp Rohrmann, Neu-Isenburg (DE); Stephan Weiss, Rodgau (DE)

(73) Assignee: Precitec Optronik GmbH (DE)

(*) Notice: Subject to any disclaimer, the term of this patent is extended or adjusted under 35 U.S.C. 154(b) by 170 days.

(21) Appl. No.: 18/002,181

(22) PCT Filed: Jun. 10, 2021

(86) PCT No.: PCT/IB2021/055084
§ 371 (c)(1),
(2) Date: Dec. 16, 2022

(87) PCT Pub. No.: WO2021/255584
PCT Pub. Date: Dec. 23, 2021

(65) Prior Publication Data
US 2023/0417533 A1    Dec. 28, 2023

(30) Foreign Application Priority Data
Jun. 19, 2020 (DE) ............. 10 2020 116 215.4
Feb. 23, 2021 (DE) ............. 10 2021 104 190.2

(51) Int. Cl.
*G01B 9/02015* (2022.01)

(52) U.S. Cl.
CPC .................. *G01B 9/02015* (2013.01)

(58) Field of Classification Search
CPC ............ G01B 9/02015; G01B 11/0608; G01B 2210/50; G01B 11/06; G01B 11/026;
(Continued)

(56) References Cited

U.S. PATENT DOCUMENTS

| 4,861,131 A | 8/1989 | Bois et al. |
| 5,276,631 A | 1/1994 | Popovic et al. |

(Continued)

FOREIGN PATENT DOCUMENTS

| CN | 101365375 | 2/2009 |
| CN | 101393015 | 3/2009 |

(Continued)

OTHER PUBLICATIONS

English Translation of Chen et al. CN-205786373-U Description (Year: 2016).*

(Continued)

*Primary Examiner* — Tarifur R Chowdhury
*Assistant Examiner* — Akbar H. Rizvi
(74) *Attorney, Agent, or Firm* — Taylor Duma LLP

(57) ABSTRACT

An optical measuring device includes a measuring head with an imaging optical unit and an evaluation unit, wherein the measuring head is connected to the evaluation unit by way of two light-guiding fibers, wherein the evaluation unit includes a light source whose light is guided through the first light-guiding fiber into the measuring head and wherein light reflected by the measurement object is guided back through the measuring head and into a second light-guiding fiber by means of a beam splitter, in such a way that outgoing and returning light are separated, wherein the fiber ends are in mutually conjugate positions, wherein the beam splitter and the fiber ends are arranged together in a connector that is separably connected to the measuring head.

20 Claims, 2 Drawing Sheets

(58) Field of Classification Search
CPC .. G01J 3/0205; G01J 3/0218; G02B 19/0085; G02B 17/006; G02B 21/0016; G02B 23/04; G02B 23/08
See application file for complete search history.

(56) References Cited

U.S. PATENT DOCUMENTS

| | | | |
|---|---|---|---|
| 5,392,124 A | | 2/1995 | Barbee |
| 5,532,815 A | | 7/1996 | Kipman et al. |
| 5,636,027 A | * | 6/1997 | Spengler ................ G01B 11/06 250/559.28 |
| 5,691,540 A | | 11/1997 | Halle et al. |
| 5,905,572 A | | 5/1999 | Li |
| 6,057,920 A | | 5/2000 | Fercher et al. |
| 6,098,895 A | | 8/2000 | Walzel et al. |
| 6,099,522 A | | 8/2000 | Knopp et al. |
| 6,396,069 B1 | | 5/2002 | Macpherson et al. |
| 6,628,397 B1 | | 9/2003 | Nikoonahad et al. |
| 6,672,943 B2 | | 1/2004 | Vogtmann et al. |
| 6,673,654 B2 | | 1/2004 | Ohno et al. |
| 6,686,270 B1 | | 2/2004 | Subramanian et al. |
| 6,768,552 B2 | | 7/2004 | Takahashi et al. |
| 6,806,969 B2 | | 10/2004 | Clifford, Jr. et al. |
| 6,887,126 B2 | | 5/2005 | Brouillette et al. |
| 6,897,964 B2 | | 5/2005 | Takahashi et al. |
| 7,271,916 B2 | | 9/2007 | Jasapara et al. |
| 7,306,696 B2 | | 12/2007 | Lian et al. |
| 7,307,735 B2 | | 12/2007 | Hecht et al. |
| 7,443,517 B2 | | 10/2008 | Sawabe et al. |
| 7,477,401 B2 | | 1/2009 | Marx et al. |
| 7,525,732 B2 | | 4/2009 | Uehara et al. |
| 7,652,774 B2 | | 1/2010 | Lian et al. |
| 7,705,995 B1 | | 4/2010 | Johs et al. |
| 7,738,113 B1 | | 6/2010 | Marx et al. |
| 7,826,068 B2 | | 11/2010 | Czerkas |
| 7,853,429 B2 | | 12/2010 | Fettig et al. |
| 7,935,217 B2 | | 5/2011 | Yashiki et al. |
| 8,716,039 B2 | | 5/2014 | Dusemund |
| 8,982,339 B2 | | 3/2015 | Schonleber et al. |
| 9,295,391 B1 | | 3/2016 | Tearney |
| 9,297,645 B2 | | 3/2016 | Schonleber |
| 9,494,409 B2 | | 11/2016 | Schonleber |
| 9,500,471 B2 | | 11/2016 | Michelt |
| 9,677,871 B2 | | 6/2017 | Schonleber |
| 9,982,994 B2 | | 5/2018 | Schonleber et al. |
| 10,228,551 B1 | | 3/2019 | Dietz et al. |
| 10,234,265 B2 | | 3/2019 | Schönleber et al. |
| 10,466,357 B1 | | 11/2019 | Dietz |
| 10,725,178 B2 | | 7/2020 | Dietz |
| 11,460,577 B2 | | 10/2022 | Dietz |
| 2002/0001078 A1 | * | 1/2002 | Gobel ................ G01N 21/8901 250/339.05 |
| 2002/0148983 A1 | | 10/2002 | Inoue et al. |
| 2002/0153500 A1 | | 10/2002 | Fordahl et al. |
| 2003/0016353 A1 | | 1/2003 | Detalle et al. |
| 2003/0090671 A1 | | 5/2003 | Takahashi et al. |
| 2004/0021874 A1 | | 2/2004 | Shimmick |
| 2004/0073081 A1 | * | 4/2004 | Schramm ................ A61B 5/0059 600/101 |
| 2004/0185582 A1 | | 9/2004 | Kueny |
| 2004/0262529 A1 | | 12/2004 | Yoshida et al. |
| 2005/0003642 A1 | | 1/2005 | Hecht et al. |
| 2005/0073692 A1 | | 4/2005 | De Groot |
| 2005/0140981 A1 | | 6/2005 | Waelti |
| 2005/0237537 A1 | | 10/2005 | Leizerson et al. |
| 2005/0248771 A1 | | 11/2005 | Eussen et al. |
| 2006/0132790 A1 | | 6/2006 | Gutin |
| 2006/0194419 A1 | | 8/2006 | Araki |
| 2007/0030483 A1 | * | 2/2007 | Everett ................ G01B 9/02091 356/328 |
| 2007/0046948 A1 | | 3/2007 | Podoleanu et al. |
| 2007/0086018 A1 | | 4/2007 | Shih et al. |
| 2007/0148792 A1 | | 6/2007 | Marx et al. |
| 2007/0188765 A1 | | 8/2007 | Zhao et al. |
| 2007/0231717 A1 | | 10/2007 | Rivers et al. |
| 2007/0258095 A1 | | 11/2007 | Oliver et al. |
| 2008/0013078 A1 | | 1/2008 | Podoleanu et al. |
| 2008/0013960 A1 | | 1/2008 | Tearney et al. |
| 2008/0151237 A1 | | 6/2008 | Lian et al. |
| 2009/0031792 A1 | | 2/2009 | Fan et al. |
| 2009/0059239 A1 | | 3/2009 | Hoffmann et al. |
| 2009/0078888 A1 | | 3/2009 | Namba et al. |
| 2009/0097806 A1 | | 4/2009 | Viellerobe et al. |
| 2009/0128824 A1 | | 5/2009 | Leitgeb et al. |
| 2009/0250635 A1 | | 10/2009 | Sykora et al. |
| 2009/0257065 A1 | | 10/2009 | Hauger et al. |
| 2009/0262353 A1 | | 10/2009 | Benvegnu et al. |
| 2009/0268020 A1 | | 10/2009 | Buckland et al. |
| 2009/0268209 A1 | | 10/2009 | Waelti et al. |
| 2009/0273782 A1 | | 11/2009 | Yoo et al. |
| 2010/0007894 A1 | | 1/2010 | Suehira |
| 2010/0051068 A1 | | 3/2010 | Miyanari |
| 2010/0110376 A1 | | 5/2010 | Everett et al. |
| 2010/0157308 A1 | | 6/2010 | Xie |
| 2010/0265493 A1 | | 10/2010 | Jiang et al. |
| 2010/0283842 A1 | | 11/2010 | Guissin et al. |
| 2010/0321671 A1 | | 12/2010 | Marx et al. |
| 2011/0085136 A1 | | 4/2011 | Ferguson et al. |
| 2011/0180521 A1 | | 7/2011 | Quitter et al. |
| 2011/0222070 A1 | | 9/2011 | Nagai et al. |
| 2011/0292375 A1 | | 12/2011 | Marx et al. |
| 2012/0050723 A1 | | 3/2012 | Emtman et al. |
| 2012/0200859 A1 | | 8/2012 | Breitenstein et al. |
| 2012/0206710 A1 | | 8/2012 | Niemela et al. |
| 2012/0238869 A1 | | 9/2012 | Schmitt et al. |
| 2012/0257207 A1 | | 10/2012 | Marx et al. |
| 2012/0257213 A1 | | 10/2012 | Schonleber |
| 2012/0320380 A1 | | 12/2012 | Schonleber |
| 2013/0034918 A1 | | 2/2013 | Dusemund et al. |
| 2013/0070732 A1 | | 3/2013 | Noh et al. |
| 2013/0120740 A1 | | 5/2013 | Schonleber |
| 2013/0162978 A1 | | 6/2013 | Yazdanfar et al. |
| 2014/0368830 A1 | | 12/2014 | Michelt |
| 2015/0260504 A1 | | 9/2015 | Schonleber |
| 2017/0227350 A1 | | 8/2017 | Sarunic et al. |
| 2017/0234678 A1 | | 8/2017 | Schonleber et al. |
| 2017/0276544 A1 | * | 9/2017 | Gastaldo ................ G01B 11/022 |
| 2017/0301751 A1 | | 10/2017 | Agata et al. |
| 2018/0038680 A1 | * | 2/2018 | Reolon ................ G01B 11/0608 |
| 2018/0164089 A1 | | 6/2018 | Schonleber et al. |
| 2019/0137626 A1 | | 5/2019 | Dietz |
| 2020/0166327 A1 | | 5/2020 | Hariyama et al. |
| 2020/0174127 A1 | | 6/2020 | Dietz |

FOREIGN PATENT DOCUMENTS

| | | | |
|---|---|---|---|
| CN | 205786373 U | * | 12/2016 |
| DE | 19525770 | | 8/1996 |
| DE | 69622943 | | 3/2003 |
| DE | 10319843 | | 4/2004 |
| DE | 102004011189 | | 9/2005 |
| DE | 102004052205 | | 5/2006 |
| DE | 102005036719 | | 2/2007 |
| DE | 60028709 | | 5/2007 |
| DE | 102005052743 | | 5/2007 |
| DE | 102006034244 | | 1/2008 |
| DE | 102007048295 | | 4/2009 |
| DE | 102008041062 | | 4/2009 |
| DE | 102010000079 | | 1/2010 |
| DE | 102008049821 | | 4/2010 |
| DE | 10325942 | | 9/2010 |
| DE | 102010015944 | | 7/2011 |
| DE | 102010016862.9 | | 9/2011 |
| DE | 102011081596 | | 4/2012 |
| DE | 102011051146 | | 10/2012 |
| DE | 102011117523 | | 4/2013 |
| DE | 102011055735 | | 5/2013 |
| DE | 102012111008 | | 5/2014 |
| DE | 102013008269 | | 11/2014 |
| DE | 202008018535 | | 7/2015 |
| DE | 102019122866 | | 10/2019 |
| EP | 0547227 | | 6/1993 |
| EP | 0905476 | | 3/1999 |
| EP | 1018632 | | 7/2000 |

(56) References Cited

FOREIGN PATENT DOCUMENTS

| EP | 1977850 | 10/2008 |
| --- | --- | --- |
| EP | 2159535 | 3/2010 |
| EP | 2076733 | 12/2012 |
| EP | 3228979 | 10/2017 |
| FR | 2930334 | 10/2009 |
| FR | 2950441 | 3/2011 |
| GB | 1105819 | 3/1968 |
| GB | 2497792 | 6/2013 |
| IN | 102209878 | 10/2011 |
| JP | 6065963 | 4/1988 |
| JP | H07311019 | 11/1995 |
| JP | H10335288 | 12/1998 |
| JP | H11132736 A | 5/1999 |
| JP | 2001235311 | 8/2001 |
| JP | 200259364 | 2/2002 |
| JP | 2020085717 A | 6/2020 |
| KR | 1020080112436 | 12/2008 |
| TW | 200712585 | 4/2007 |
| TW | 200937005 | 9/2009 |
| WO | 1997027613 | 7/1997 |
| WO | 2006028926 | 3/2006 |
| WO | 2006084279 | 8/2006 |
| WO | 2007060441 | 5/2007 |
| WO | 2008010996 | 1/2008 |
| WO | 2011086490 | 7/2011 |
| WO | 2011141867 | 11/2011 |
| WO | 2013070732 | 5/2013 |
| WO | 2014076649 | 5/2014 |

OTHER PUBLICATIONS

Precitec Optronik GmbH; Office Action for Japanese patent application No. 2022-578565, mailed Mar. 21, 2024, 4 pgs.
Schoenleber; German Examination Report for serial No. DE102012102826, mailed Sep. 28, 2012, 14 pgs.
Schonleber, Martin; Corrected Notice of Allowability for U.S. Appl. No. 13/440,434, filed Apr. 5, 2012, mailed Mar. 1, 2016, 6 pgs.
Schonleber, Martin; Final Office Action for U.S. Appl. No. 13/440,434, filed Apr. 5, 2012, mailed Feb. 10, 2014, 20 pgs.
Schonleber, Martin; Issue Notification for U.S. Appl. No. 13/440,434, filed Apr. 5, 2012, mailed Mar. 9, 2016, 1 pg.
Schonleber, Martin; Non Final Office Action for U.S. Appl. No. 13/440,434, filed Apr. 5, 2012, mailed Oct. 14, 2014, 16 pgs.
Schonleber, Martin; Non-Final Office Action for U.S. Appl. No. 13/440,434, filed Apr. 5, 2012, mailed Jun. 25, 2015, 21 pgs.
Schonleber, Martin; Non-Final Office Action for U.S. Appl. No. 13/440,434, filed Apr. 5, 2012, mailed Sep. 24, 2013, 34 pgs.
Schonleber, Martin; Notice of Allowance for U.S. Appl. No. 13/440,434, filed Apr. 5, 2012, mailed Jan. 13, 2016, 11 pgs.
Schonleber, Martin; Notice of Allowance for U.S. Appl. No. 13/440,434, filed Apr. 5, 2012, mailed Dec. 12, 2015, 9 pgs.
Schonleber, Martin; Notice of Allowance for U.S. Appl. No. 13/440,434, filed Apr. 5, 2012, mailed Sep. 23, 2015, 11 pgs.
Schonleber; United Kingdom Search Report for serial No. GB1105819.5, filed Apr. 6, 2011, mailed Jul. 23, 2012, 4 pgs.
Dusemund, Claus; Issue Notification for U.S. Appl. No. 13/521,736, filed Jul. 11, 2012, mailed Apr. 16, 2014, 1 pg.
Dusemund, Claus; Non-Final Office Action for U.S. Appl. No. 13/521,736, filed Jul. 11, 2012, mailed Jul. 23, 2013, 18 pgs.
Dusemund, Claus; Notice of Allowance for U.S. Appl. No. 13/521,736, filed Jul. 11, 2012, mailed Dec. 27, 2013, 8 pgs.
Dusemund; International Search Report and Written Opinion for serial No. PCT/IB2011/050091, filed Jan. 10, 2011, mailed Apr. 12, 2011, 17 pgs.
Precitec Optronik GmbH; Extended European Search Report for serial No. EP12172165, mailed Oct. 24, 2012, 5 pgs.
Precitec Optronik GmbH; Korean Notice of Preliminary Rejection for serial No. 10-2012-0064923, filed Jun. 18, 2012, mailed Oct. 30, 2014, 11 pgs.

Schonleber, Martin; Applicant Interview Summary for U.S. Appl. No. 13/525,184, filed Jun. 15, 2012, mailed Oct. 27, 2015, 3 pgs.
Schonleber, Martin; Final Office Action for U.S. Appl. No. 13/525,184, filed Jun. 15, 2012, mailed Oct. 7, 2014, 17 pgs.
Schonleber, Martin; Final Office Action for U.S. Appl. No. 13/525,184, filed Jun. 15, 2012, mailed Jul. 28, 2015, 32 pgs.
Schonleber, Martin; Issue Notification for U.S. Appl. No. 13/525,184, filed Jun. 15, 2012, mailed Oct. 26, 2016, 1 pg.
Schonleber, Martin; Non-Final Office Action for U.S. Appl. No. 13/525,184, filed Jun. 15, 2012, mailed Feb. 25, 2014, 16 pgs.
Schonleber, Martin; Non-Final Office Action for U.S. Appl. No. 13/525,184, filed Jun. 15, 2012, mailed Feb. 19, 2015, 21 pgs.
Schonleber, Martin; Notice of Allowance for U.S. Appl. No. 13/525,184, filed Jun. 15, 2012, mailed Jul. 12, 2016, 21 pgs.
Schonleber; German Examination Report for serial No. DE102011051146, filed Oct. 4, 2012, mailed Jan. 19, 2012, 6 pgs.
Dusemund; International Preliminary Report on Patentability for serial No. PCT/IB2011/050091, filed Jan. 10, 2011, mailed Aug. 16, 2012, 14 pgs.
Schonleber, Martin; Non-Final Office Action for U.S. Appl. No. 13/525,184, filed Jun. 15, 2012, mailed Dec. 31, 2015, 21 pgs.
Schonleber, Martin; Final Office Action for U.S. Appl. No. 13/667,809, filed Nov. 2, 2012, mailed Sep. 16, 2013, 9 pgs.
Schonleber, Martin; Issue Notification for U.S. Appl. No. 13/667,809, filed Nov. 2, 2012, mailed Feb. 25, 2015, 1 pg.
Schonleber, Martin; Non-Final Office Action for U.S. Appl. No. 13/667,809, filed Nov. 2, 2012, mailed Apr. 15, 2013; 12 pgs.
Schonleber, Martin; Non-Final Office Action for U.S. Appl. No. 13/667,809, filed Nov. 2, 2012, mailed Apr. 24, 2014; 8 pgs.
Schonleber, Martin; Notice of Allowance for U.S. Appl. No. 13/667,809, filed Nov. 2, 2012, mailed Dec. 4, 2014, 10 pgs.
Schonleber; International Preliminary Report on Patentability for serial No. PCT/IB2011/052048 filed May 10, 2011, mailed Nov. 22, 2012, 7 pgs.
Michelt, Berthold; Applicant Initiated Interview Summary for U.S. Appl. No. 14/307,481, filed Jun. 17, 2014, mailed Jul. 1, 2016, 3 pgs.
Michelt, Berthold; Applicant Interview Summary for U.S. Appl. No. 14/307,481, filed Jun. 17, 2014, mailed Nov. 20, 2015, 3 pgs.
Michelt, Berthold; Issue Notification for U.S. Appl. No. 14/307,481, filed Jun. 17, 2014, mailed Nov. 2, 2016, 1 pg.
Michelt, Berthold; Non-Final Office Action for U.S. Appl. No. 14/307,481, filed Jun. 17, 2014, mailed Aug. 26, 2015, 41 pgs.
Michelt, Berthold; Notice of Allowance for U.S. Appl. No. 14/307,481, filed Jun. 17, 2014, mailed Jul. 25, 2016, 20 pgs.
Schonleber, Martin; Chinese Office Action for serial No. 201380059958.1, filed Nov. 14, 2013, mailed Oct. 9, 2016, 11 pgs.
Schonleber; International Search Report and Written Opinion for serial No. PCT/IB2011/052048 filed May 10, 2011, mailed Sep. 21, 2011, 12 pgs.
Michelt, Berthold; Final Office Action for U.S. Appl. No. 14/307,481, filed Jun. 17, 2014, mailed Feb. 12, 2016, 24 pgs.
Precitec Optronic GmbH; International Search Report and Written Opinion for serial No. PCT/IB2014/062290, filed Jun. 17, 2014, mailed Sep. 22, 2014, 20 pgs.
Schonleber, Martin; Notice of Allowance for U.S. Appl. No. 14/713,150, filed May 15, 2015, mailed Feb. 9, 2017, 16 pgs.
Schonleber, Martin; Issue Notification for U.S. Appl. No. 14/713,150, filed May 15, 2015, mailed May 24, 2017; 1 pg.
Schonleber, Martin; Non-Final Office Action for U.S. Appl. No. 14/713,150, filed May 15, 2015, mailed Sep. 6, 2016; 50 pgs.
Schonleber, Martin; Issue Notification for U.S. Appl. No. 15/588,021, filed May 5, 2017, mailed May 9, 2018, 1 pg.
Schonleber, Martin; Notice of Allowance for U.S. Appl. No. 15/588,021, filed May 5, 2017, mailed Feb. 15, 2018, 33 pgs.
Schönleber, Martin; Ex Parte Quayle Action for U.S. Appl. No. 15/433,173, filed Feb. 15, 2017, mailed Aug. 23, 2018, 30 pgs.
Schonleber, Martin; International Search Report and Written Opinion for PCT/IB2013/060127, filed Nov. 14, 2013, mailed Mar. 21, 2014, 27 pgs.
Schönleber, Martin; German Examination Report for serial No. 102012111008.5, filed Nov. 15, 2012, mailed Jun. 19, 2013, 17 pgs.

(56) References Cited

OTHER PUBLICATIONS

Schonleber, Martin; Issue Notification for U.S. Appl. No. 15/433,173, filed Feb. 15, 2017, mailed Feb. 27, 2019, 1 pg.

Schönleber, Martin; Notice of Allowance for U.S. Appl. No. 15/433,173, filed Feb. 15, 2017, mailed Nov. 20, 2018, 15 pgs.

Dietz, Christoph; Final Office Action for U.S. Appl. No. 16/184,222, filed Nov. 8, 2018, mailed Apr. 15, 2022, 17 pgs.

Dietz, Christoph; German Examination Report for serial No. 10 2017 126 310.1, filed Nov. 9, 2017, mailed Jul. 13, 2018, 14 pgs.

Dietz, Christoph; Non-Final Office Action for U.S. Appl. No. 16/184,222, filed Nov. 8, 2018, mailed Dec. 15, 2021, 60 pgs.

Dietz, Christoph; Notice of Allowance for U.S. Appl. No. 16/184,222, filed Nov. 8, 20218, mailed Jul. 20, 2022, 8 pgs.

Precitec Optronik GmbH, Office Action for Chinese application No. 201811320266.9, filed Nov. 7, 2018, mailed Jul. 1, 2020, 11 pgs.

Precitec Optronik GmbH; Notice of Preliminary Rejection for Korean application No. 10-2018-0134156, mailed Jun. 19, 2019, 11 pgs.

Precitec Optronik GmbH; Office Action for Japanese patent application No. 2018-197191, mailed Nov. 26, 2019, 6 pgs.

Dietz, Christoph; Non-Final Office Action for U.S. Appl. No. 16/361,955, filed Mar. 22, 2019, mailed May 23, 2019, 43 pgs.

Dietz, Christoph; Notice of Allowance for U.S. Appl. No. 16/361,955, filed Mar. 22, 2019, mailed Sep. 3, 2019, 12 pgs.

Dietz, Christoph; Corrected Notice of Allowance for U.S. Appl. No. 16/550,708, filed Aug. 26, 2019, mailed Apr. 20, 2020, 2 pgs.

Dietz, Christoph; Corrected Notice of Allowance for U.S. Appl. No. 16/550,708, filed Aug. 26, 2019, mailed May 29, 2020, 6 pgs.

Dietz, Christoph; Non-Final Office Action for U.S. Appl. No. 16/550,708, filed Aug. 26, 2019, mailed Jan. 23, 2020, 13 pgs.

Dietz, Christoph; Notice of Allowance for U.S. Appl. No. 16/550,708, filed Aug. 26, 2019, mailed Apr. 15, 2020, 7 pgs.

Dietz, Christoph; International Preliminary Report on Patentability for PCT/IB2021/055084, filed Jun. 10, 2021, mailed Dec. 13, 2022, 12 pgs.

Dietz, Christoph; International Search Report and Written Opinion for PCT/IB2021/055084, filed Jun. 10, 2021, mailed Sep. 20, 2021, 18 pgs.

Owen, et al.; Article entitled: "New spectroscopic instrument based on volume holographic optical elements", Proceedings of SPIE, US, vol. 2406, Apr. 12, 1995 (Apr. 12, 1995), pp. 260-267, 9 pgs.

ISIS Sentronics Gmbh Data Sheet, "StraDex a3 sensor" and "StraDex f2-80 sensor head", publicly available prior to Oct. 11, 2012, 3 pgs.

Precitec Optronic GmbH; German Examination Report for German Application No. DE102013010030.5, filed Jun. 17, 2013, mailed Feb. 28, 2014, 12 pgs.

Huang et al.; "Optical coherence tomography", Science, vol. 254, No. 5035, S. 1178-1181, published Nov. 22, 1991, 4 pgs.

Precitec Optronik GmbH; International Search Report and Written Opinion for PCT/DE2019/200123, filed Nov. 5, 2019, mailed Mar. 26, 2020, 61 pgs.

Jakob, Dr. G., "Koaxiale Interferometrische Schichtdickenmessung", Optical Measuring, Sonderdruck aus Photonik Mar. 2000; 4 pgs.

Knuttel, Dr. Alexander; "Non-compact Roughness and 3D Topography Evaluation of grinded Wafers down to nm level", Dec. 1, 2010, 25 pgs.

Malta, D. et al.; "Fabrication of TSV-Based Silicon Interposers", RTI International, publicly available prior to Oct. 11, 2012, 6 pgs.

Niklaus, et al. "Adhesive Wafer Bonding", Journal of Applied Physics, Applied Physics Reviews—Focused Review, 2006, vol. 99, No. 1, pp. 031101.1-031101.28, 29 pgs.

Precitec Optronik GmbH; French Preliminary Search Report and Written Opinion for serial No. FR1253225, mailed Nov. 13, 2013, 10 pgs.

Precitec Optronik GmbH; German Examination Report for serial No. 102014008584.8, mailed Apr. 21, 2016, 13 pgs.

Rowland, et al. "Impact of polymer film thickness and cavity size on polymer flow during embossing: toward process design rules for nanoimprint lithography", Journal of Micromechanics and Microengineering, 2005, vol. 15, pp. 2414-2425, 12 pgs.

Micro-Epsilon USA; Brochure for Confocal Chromatic Measurement System, cited in the German Examination Report for serial No. 10 2014 008 584.8, mailed on Apr. 21, 2016, 11 pgs.

Micro-Epsilon; Article entitled: "New Generation of Confocal Measurement Technology", located at <http://www.microepsilon.com/press/release/PR231confocalDT/ index.html?sLang=us>, accessed on Jul. 7, 2016, 2 pgs.

Taiwan Office Action for serial No. 101121622, filed Jun. 15, 2012, mailed May 21, 2014, 15 pgs.

Vakhtin et al.; "Common-path interferometer for frequency-domain optical coherence tomography"; Applied Optics, vol. 42, No. 34, S. 6953-6957, published Dec. 1, 2003, 6 pgs.

Lucke, et al.; Article entitled: "Mikrooptische Sensoren nach dem chromatisch konfokalen Messprinzip", Forschungszentrum Karlsruhe GmbH, Karlsruhe 2006, 23 pgs.

Precitec Optronik GmbH, Office Action and English Translation for corresponding Japanese Application No. 2022-578565, filed Jun. 10, 2021, mailed Sep. 26, 2024, 19 pages.

\* cited by examiner

FIG. 1
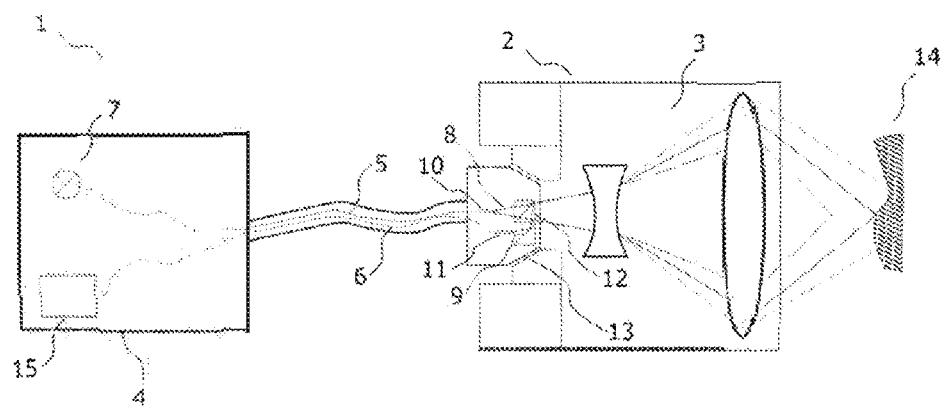
FIG. 2A
FIG. 2B
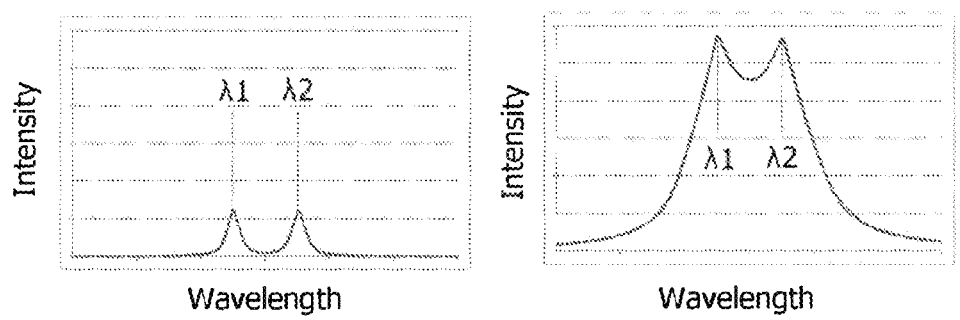
FIG. 3A
Fig. 3B
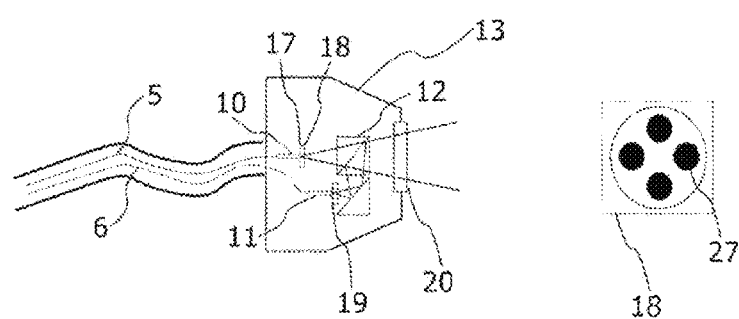

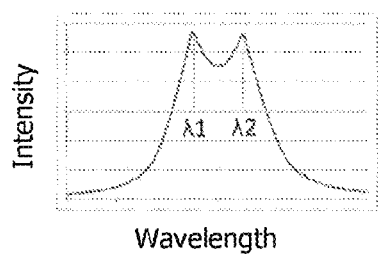
FIG. 4A
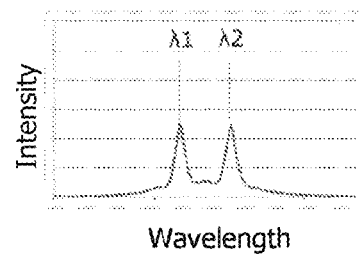
FIG. 4B
FIG. 5
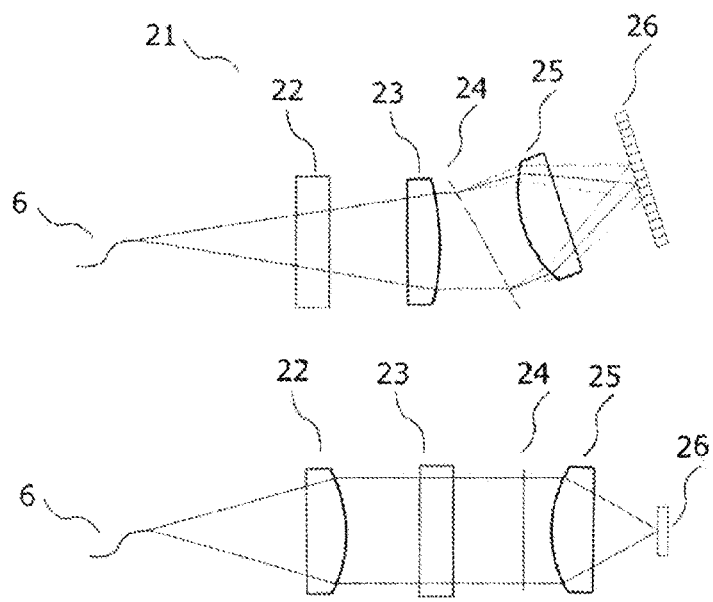

CHROMATIC CONFOCAL MEASURING DEVICE

TECHNICAL FIELD

Field of Use

The invention relates to an optical measuring device for measuring distances and/or thicknesses of an object to be measured.

Related Art

Optical measuring devices are known which are based on the chromatic-confocal or the interferometric measuring principle. FR2930334 describes a chromatic-confocal measuring head with a beam splitter unit integrated in the measuring head. This beam splitter unit and the fibers for the outgoing and the return light are firmly connected to the measuring head. The beam splitter unit in the measuring head leads to a reduction of stray light and to improved measuring accuracy. In this implementation, disadvantageously, no exchange of the fibers is possible, e.g., if a fiber is defective or a fiber with other properties (length, fiber core diameter, . . . ) is required. This limits the possible applications of the measuring head.

SUMMARY

The optical measuring device comprises a measuring head with an imaging optics and an evaluation unit, wherein the measuring head is connected to the evaluation unit by two light-conducting fibers. The evaluation unit comprises a light source the light of which is guided into the measuring head through the first light-conducting fiber. Light reflected from the object to be measured is guided back through the measuring head and into a second light-conducting fiber by means of a beam splitter such that the outgoing and the return light is separated, wherein the fiber ends are located in conjugate positions with respect to each other.

The object of the invention is to provide a chromatic-confocal measuring head that allows exchange of the fibers without significantly increasing the portion of stray light.

Such a solution does not yet exist in the prior art. Known fiber connectors that would allow the exchange of individual fibers have a relatively high space requirement. Since the measuring head with built-in beam splitter unit would have to include two fiber connectors (for the outgoing and the return light), no compact measuring heads could be realized with these fiber connectors.

According to the invention, the object is solved in that the beam splitter and the fiber ends are arranged together in a connector which is separably connected to the measuring head.

In an advantageous embodiment, the fiber ends of the first and second light-conducting fibers respectively form confocal apertures. The first fiber end is imaged by the measuring head onto an object to be measured. The cross section of the first fiber defines the diameter of the measuring spot, i.e., the image of the fiber end on the object to be measured.

The second fiber end serves as a spatial filter for the measuring light, which is reflected from the object to be measured and guided by the measuring head to the second fiber end. Since the two fiber ends are located in conjugate positions with respect to each other, the first and second fiber ends thus serve as confocal apertures. It is advantageous to use the fiber ends as confocal apertures, as this eliminates the need for an additional component forming the apertures. It also avoids having to align the fiber with a separate aperture component. In this embodiment, the diameter of the fiber is the diameter of the aperture.

An advantage of the measuring head with exchangeable fiber connector compared to a measuring head with fixed fiber connector is that the size of the confocal aperture—which in this implementation is given by the cross section of the light-conducting fibers—can be changed by exchanging the fiber connector.

In chromatic-confocal measurement, there is an opposing dependence between the achievable resolution and the intensity of the measuring light (and thus the signal strength) via the aperture size. Which aperture size is most suitable depends on the specific measurement task.

This dependence is illustrated in FIG. 2A and FIG. 2B. FIG. 2A and FIG. 2B illustrate exemplarily the effect of the aperture size on the measurement signal when measuring a transparent layer with a chromatic-confocal measuring head. The intensity of the measuring light, which is guided from the second light-conducting fiber to the evaluation unit, is shown as a function of the wavelength.

The reflection of the measuring light at the upper side and the lower side, respectively, of the transparent layer leads to the appearance of two peaks, characterized by two peak wavelengths ($\lambda_1$, $\lambda_2$). The difference between the peak wavelengths provides information about the thickness of the layer.

The two diagrams differ in the fiber diameter, which is four times larger in FIG. 2B than FIG. 2A. In FIG. 2A, the peaks are clearly separated. In FIG. 2B, the signal strength is significantly greater because the larger fiber diameter allows more light to be guided from the light source to the measuring head and from the object to be measured to the evaluation unit. However, the larger fiber diameter also leads to a larger peak width, so that the layer thickness cannot be resolved as well as in the left diagram.

A smaller fiber diameter leads to a smaller measuring spot—which allows objects to be measured to be better resolved in the lateral direction—as well as to better axial resolution, so that thin layers can be better measured. In return, the signal strength decreases, which requires longer exposure times for objects to be measured of low reflectivity, which in turn has a negative effect on the measuring rate.

The configuration of conventional measuring devices, in particular the light-conducting fiber used and the imaging ratio of the chromatic-confocal measuring head, provide a fixed compromise between resolution and signal strength.

However, the optimal combination of resolution and signal strength depends on the properties of the object to be measured or the measurement task, respectively. If, for example, a better lateral resolution is required for a special measurement task, then in the prior art—with a fixed integrated beam splitter unit—it is necessary to exchange the measuring head. However, this is time-consuming and leads to increased costs if different measuring heads are required for different measurement tasks.

The present invention solves this problem by using an exchangeable fiber connector. This provides a simple and cost-effective solution to the problem of obtaining the optimum combination of resolution and signal strength for each measurement task.

In another preferred embodiment of the invention, the fiber connector comprises a first aperture arrangement arranged behind the first fiber end and acting as a spatial filter for the light emitted from the first fiber end, and a second aperture arrangement arranged in front of the second fiber end and acting as a spatial filter for the light guided from the measuring head to the second fiber end. The first and second aperture arrangements are located at conjugate positions with respect to each other and thus serve as confocal apertures.

This embodiment provides the advantage that the geometry of the confocal aperture can be freely configured over a wide range and optimized for a specific measurement task.

The above explanations on the influence of the fiber diameters apply accordingly to cross sections of apertures.

FIG. 3B shows an example of a possible configuration of the aperture arrangement. The light-transmissive areas are marked dark here. The aperture arrangement consists of 4 circular sub-apertures. Compared to a single aperture of the same size, the signal strength is increased by a factor of 4. Due to the distance between the sub-apertures, the crosstalk, i.e., the influence of each sub-aperture on the neighboring sub-apertures, is kept low.

FIG. 4B shows the corresponding wavelength-resolved measurement signal when measuring a layer thickness with a chromatic-confocal measuring head. The width of the peaks is determined here by the diameter of the individual circular sub-apertures, i.e., similarly small layer thicknesses can be resolved as with a single aperture. At the same time, however, as mentioned, the signal strength is increased by a factor of 4, which allows higher measurement rates.

The wide background signal is caused by the crosstalk of the individual circular sub-apertures. The geometry of the aperture arrangement, in particular the diameters and spacings of the circular sub-apertures, can be used to influence parameters such as the peak width and the size of the background signal within wide limits. Thus, it is possible to obtain the optimum combination of resolution and signal strength for each measurement task by exchanging the fiber connector.

In addition to the geometry of the aperture arrangement shown in FIG. 3B, a variety of other aperture geometries optimized for the particular measurement task can be realized.

For example, this includes one-dimensional arrangements of sub-apertures, such as a line of individual circular sub-apertures. Such an arrangement results in spatial averaging of the measurement signal in the direction of the line, while maintaining high spatial resolution in the orthogonal direction.

Another advantageous configuration is a two-dimensional arrangement of sub-apertures. In addition to the geometry shown in FIG. 4A and FIG. 4B, this includes, for example, a hexagonal pattern of circular sub-apertures or a checkerboard pattern.

The aperture arrangement may be configured as a glass plate that is partially coated with a chromium layer on the side of the optical fiber. The areas of the glass plate that are coated with chromium act as non-transmissive areas, while the non-coated areas act as light-transmissive areas.

In an advantageous embodiment, the measuring device measures according to the chromatic-confocal principle. In this case, the measuring head comprises dispersive optical elements that generate a longitudinal chromatic aberration so that the distance between the measuring head and the measuring spot—the image of a first confocal aperture—has a clear dependence on the wavelength.

A second confocal aperture receives the light that is reflected from an object to be measured and is guided from the measuring head to the second confocal aperture. The intensity of the light transmitted by the second confocal aperture and guided to the evaluation unit is maximum at the wavelength at which the measuring spot is sharply imaged on the object to be measured.

In another embodiment, the measuring device measures according to the spectral interferometric measuring principle. In this case, the light from the measuring head is guided onto two interfaces and the light reflected from the interfaces is picked up by the measuring head and guided to an evaluation unit.

In the evaluation unit, the phase difference between the light reflected from the first interface and the light reflected from the second interface is determined. The dependence of the phase difference on the wavelength provides information about the path length difference and thus the distance between the two interfaces.

In an advantageous embodiment, the connector is configured such that the fiber ends are positioned relative to the measuring head in a precisely repeatable manner, in particular within predetermined tolerances. In particular, the measuring head and the connector are configured such that the relative position of the confocal apertures to the imaging optics is maintained within the given tolerances when the connector is exchanged.

This can ensure that the properties of the measuring head remain largely unchanged when the fiber connector is exchanged. In particular, it can be ensured that the position of the measuring spot in relation to the measuring head remains unchanged. This provides the advantage that the measuring device does not have to be recalibrated when the fiber connector is exchanged, which simplifies the operation of the measuring device.

In an embodiment, the connector has a cone shape or a truncated cone shape which is positioned in a cone-shaped recess of the measuring head. The cone shape or the truncated cone shape of the connector ensures that the connector is always centered with respect to the measuring head. In particular, there is no lateral offset (with respect to the optical axis of the imaging optics) between the confocal apertures and the imaging optics when the connector is exchanged.

Due to the cone shape or the truncated cone shape of the connector, the outer dimensions of the connector and the inner dimensions of the recess of the measuring head may be manufactured with a very small fit tolerance without affecting the detachability of the connector from the measuring head. This also allows the axial offset between the confocal apertures and the imaging optics to be minimized arbitrarily.

In alternative embodiments, the connector may also have a shape other than a cone and may, for example, be configured as a truncated pyramid.

In further alternative embodiments, the connector and the measuring head may comprise means, such as grooves and balls, for ensuring that the orientation and position of the connector always remain the same after connection to the measuring head.

In an embodiment, the connector comprises a protective glass mounted on the side facing the measuring head. The protective glass offers the advantage that the connector is protected from contamination when the connector is not connected to the measuring head.

In particular, when the protective glass is in the divergent beam path—for example, when there are no focusing optical elements between the fiber ends and the protective glass—only a negligible portion of the stray light reflected by the protective glass is guided to the second fiber end, so that the measurement signal is not impaired.

In an according manner, the measuring head may be provided with a protective glass on the side facing the connector.

The beam splitter and the protective glass may be provided with an anti-reflective coating to further reduce the small portion of stray light. This makes it possible, in particular, to place the elements close to the fiber ends, which allows for a particularly compact configuration of the connector.

In a possible embodiment, the measuring head is connected to the evaluation unit by at least four light-conducting fibers, wherein the fibers are each arranged conjugate in pairs, in particular in two lines. For each pair of fibers, a measurement signal can be guided to the evaluation unit and evaluated independently of the other measurement signals.

This allows, for example, several measuring spots to be created on the object to be measured, so that the light reflected from the object to be measured at several measuring points is picked up by the measuring head and evaluated individually.

For existing measuring heads with a simple fiber holder, the fiber holder can be replaced by a mounting device for a fiber connector (with beam splitter unit) without any major effort. The measuring heads can thus continue to be used and enjoy the advantages of the beam splitter connector.

BRIEF DESCRIPTION OF THE FIGURES

FIG. 1: Measuring device with fiber connector
FIG. 2A: Measurement signal for a first aperture diameter
FIG. 2B: Measurement signal for a second aperture diameter
FIG. 3A: Fiber connector
FIG. 3B: Fiber connector aperture arrangement
FIG. 4A: Aperture arrangement and associated measurement signal with a single circular aperture
FIG. 4B: Aperture arrangement and associated measurement signal with an arrangement of four circular sub-apertures
FIG. 5: Spectrometer

DETAILED DESCRIPTION

FIG. 1 shows an optical measuring device (1) according to the invention, which measures according to the chromatic-confocal measuring principle. The optical measuring device comprises a measuring head (2) which is connected to an evaluation unit (4) by two light-conducting fibers (5, 6).

The evaluation unit comprises a light source (7) that feeds polychromatic light into the first light-conducting fiber (5), which guides the light to the measuring head. The first light-conducting fiber comprises a first fiber end (10). The measuring head comprises an imaging optics (3) that guides at least a portion of the light emitted from the first fiber end to an object to be measured (14).

The imaging optics has a pronounced longitudinal chromatic aberration so that the light emitted from the first fiber end is focused at different distances from the measuring head depending on the wavelength.

The light reflected by the object to be measured is picked up by the measuring head. At least part of the light reflected by the object to be measured is guided by a beam splitter (12) to a second fiber end (11) and via the second light-conducting fiber (6) further to the evaluation unit. The evaluation unit comprises a spectrometer (15) that evaluates the intensity of the light reflected by the object to be measured in spectrally resolved form.

The first and second fiber ends (10, 11) form confocal apertures. The light emitted by the first light-conducting fiber (5) and reflected by the object to be measured (14) is guided onto the second fiber (6). The second fiber end (11) serves as a spatial filter. The two fiber ends (10, 11) are located at conjugate positions with respect to each other so that the intensity of the light received by the second fiber (6) and guided to the evaluation unit is maximized for that wavelength for which the light emitted by the first fiber (5) is sharply imaged by the measuring head (2) onto the object to be measured (14).

The evaluation of the wavelength-resolved intensity in the spectrometer (15) provides information about the distance of the object to be measured (14) from the measuring head (2).

The beam splitter (12) spatially separates the light (8) emitted by the first fiber (5) and outgoing to the object to be measured (14) and the light (9) returning from the object to be measured (14) and guided to the second fiber (6). This offers the advantage that the light coming from the light source (7) and backscattered by the first fiber end (10) does not reach the second fiber (6) and thus does not influence the measurement signal.

The beam splitter (12) and the two fiber ends (10, 11) are arranged together in a connector (13) which is separably connected to the measuring head (2). The connector (13) has a truncated cone shape, while the measuring head (2) comprises a corresponding recess (16).

These geometries of the connector and the recess offer the advantage that the connector is automatically centered with respect to the recess after insertion, i.e., it is located at a defined lateral position with respect to the optical axis of the imaging optics.

This has the great advantage that the position of the light exiting surface—in this case the first fiber end-remains unchanged in relation to the imaging optics even when the connector is exchanged, so that, for example, the position of the measuring spot on the surface to be measured does not change.

FIG. 2A and FIG. 2B show a measurement signal resulting from the measurement of a transparent layer with a measuring device according to FIG. 1. The reflection of the light emitted by the measuring head at the two interfaces of the layer, i.e., the upper side and the lower side of the layer, leads to the occurrence of two intensity maxima in the measurement signal.

The maxima occur at those wavelengths at which the light is focused on the upper side or the lower side, respectively, of the layer to be measured. The two wavelengths are determined with a spectrometer and provide information about the layer thickness.

The two diagrams differ in the diameter of the light-conducting fiber; the other components of the measuring device, in particular the measuring head, are identical for both diagrams. The fiber diameter in FIG. 2B is 4 times that of FIG. 2A; this would be the case, for example, if the fiber diameter was 50 µm for FIG. 2A and 200 µm for FIG. 2B.

The smaller fiber diameter in FIG. 2A leads to better axial resolution, which is expressed here in a clear separation between the two intensity maxima. The larger fiber diameter in FIG. 2B leads to a poorer axial resolution, associated with a less clear separation of the two intensity maxima, but in return also to a higher intensity of the measuring light, which is expressed in a higher amplitude in the measurement signal.

Overall, FIG. 2A and FIG. 2B illustrate how an exchange of the fiber connector leads to a change in the properties of the measuring device with otherwise unchanged components of the measuring device. This can be used advantageously to provide the optimum properties of the measuring device for each measurement task.

FIG. 3A shows an alternative embodiment of the connector for a measuring device according to FIG. 1. The connector (13) comprises a first aperture arrangement (17) arranged directly behind the first fiber end (10). The first aperture arrangement acts as a spatial filter for the light guided from the first light-conducting fiber (5) to the measuring head and emitted from the first fiber end.

In this example, the first aperture arrangement is configured as a glass plate (18) which is partially provided with a chromium layer on the side facing the first fiber end (10). The areas provided with a chromium layer prevent transmission of light, while the non-coated areas of the glass plate are light-transmissive and define the confocal aperture.

FIG. 3B shows an exemplary configuration of the partially coated glass plate (18). The light-transmissive areas of the glass plate—i.e., the areas not coated with chromium—are shown in dark. Overall, the confocal aperture here consists of an arrangement of 4 circular sub-apertures (27).

The fiber cross section is marked here with a dashed line. Here, the fiber diameter is larger than the extent of the arrangement of the sub-apertures (27), so that all light-transmissive areas are illuminated with light from the first fiber end.

The connector in FIG. 3A further comprises a second aperture arrangement (19) arranged directly in front of the second fiber end (11). Here, the second aperture arrangement (19) is configured identically to the first aperture arrangement (17) and provides spatial filtering of the light that is guided through the measuring head from the object to be measured to the second fiber end (11) and then guided further through the second light-conducting fiber (6) to the evaluation unit.

Since the first and second fiber ends (10, 11) are located at conjugate positions with respect to each other, the first and second aperture arrangements (17, 19) are also located at conjugate positions with respect to each other and thus act as confocal apertures.

In the illustrated embodiment, the connector comprises a protective glass (20). The protective glass ensures that the optical components inside the connector remain protected from contamination, which may lead to stray light and thus may have a negative effect on the signal quality.

The light emitted from the first fiber end (10) impinges onto the protective glass (20) divergently. Part of the light is guided back on both surfaces of the protective glass to the first fiber end (10) and—via the beam splitter (12)—also to the second fiber end (11).

Due to the divergent beam path, however, the light reflected from the protective glass (20) is very strongly split up at the location of the first and second fiber ends (10, 11), so that only a negligible portion of stray light is obtained.

To further reduce the portion of stray light, the surfaces of the protective glass (20) and/or the beam splitter (12) may be provided with an anti-reflective coating. This makes it possible, in particular, to arrange the optical components in the connector close to each other and thus enable a very compact configuration for the connector without significantly increasing the portion of stray light.

FIG. 4A and FIG. 4B show a measurement signal resulting from the measurement of a transparent layer with a measuring device according to FIG. 3A and FIG. 3B. The reflection of the light emitted by the measuring head at the two interfaces of the layer, i.e., the upper side and the lower side of the layer, leads to the occurrence of two intensity maxima in the measurement signal.

The maxima occur at those wavelengths at which the light is focused on the upper side or the lower side, respectively, of the layer to be measured. The two wavelengths are determined with a spectrometer and provide information about the layer thickness.

The two diagrams differ in the configuration of the confocal apertures. In FIG. 4A, a single circular aperture is used, the diameter of which corresponds to the fiber diameter. In FIG. 4B, the confocal aperture consists of an arrangement of 4 circular sub-apertures, as shown in FIG. 3B.

In FIG. 4B, the intensity maxima are clearly separated; this is due to the improved axial resolution of the measuring device, which is determined by the diameter of the sub-apertures, which is smaller than the diameter of the light-conducting fiber. At the same time, the signal strength is increased by a factor of 4 compared to a single sub-aperture, since each sub-aperture contributes to the measurement signal.

By configuring the aperture arrangement, an optimum combination of axial resolution and signal strength can thus be achieved for each measurement task.

FIG. 5 shows a possible embodiment of the spectrometer for a measuring device according to FIG. 1. The spectrometer (21) is arranged in the evaluation unit and connected to the measuring head via the second light-conducting fiber (6). The second fiber (6) guides the light reflected from the object to be measured from the measuring head to the spectrometer (21). The spectrometer is used to evaluate the intensity of this light in spectrally resolved form.

The light emitted from the second fiber (6) is first collimated and guided onto a transmission grating. The light is diffracted by the transmission grating (24), wherein the diffraction angle depends on the wavelength. The diffracted light is then imaged onto a detector row (26) by a focusing optics, wherein the location where the light strikes the detector row depends on the wavelength.

In order to be able to evaluate the location at which the light impinges on the row, the row is divided into a plurality of light-sensitive cells in the direction of splitting (henceforth referred to as the row direction). To improve the spatial resolution—and thus the wavelength resolution—it is advantageous to keep the extent of the light-sensitive cells in the row direction small.

At the same time, it is advantageous to keep the image of the fiber on the detector row small, ideally smaller than the extent of the light-sensitive cells, i.e., to select a reducing imaging of the fiber on the detector row. In particular, when using fibers with a large fiber diameter, the imaging must be selected to be strongly reducing.

However, such a strongly reducing imaging leads disadvantageously to high numerical apertures, i.e., large aperture angles of the beam cones for the light which is guided from the focusing optics onto the detector row. To obtain good imaging quality, either a complex focusing optics must be provided—which has a negative impact on costs—or the light must be vignetted—which leads to light losses.

The embodiment of the spectrometer shown here allows the wavelength resolution to be optimized without limiting the brightness too much. For this purpose, an anamorphic imaging is chosen which strongly reduces the fiber end in the row direction, but only weakly reduces it orthogonally to the row direction.

For this purpose, the spectrometer comprises a first cylindrical lens (22) which focuses the light emitted from the second fiber (6) into the spectrometer orthogonally to the row direction, and a second cylindrical lens (23) which is arranged behind the first cylindrical lens and which focuses the light in the row direction.

The second cylindrical lens has a larger focal length than the first cylindrical lens. Due to the greater distance to the fiber, the light is vignetted in the row direction, i.e., part of the light emitted by the fiber is not guided further to the detector row. Orthogonal to the row direction, on the other hand, there is little or no vignetting.

The light collimated by the first or second cylindrical lens, respectively, passes through a transmission grating (24), is spectrally split and imaged by a spherical lens (25) onto the detector row (26). The imaging scale is smaller in the row direction than orthogonally to the row direction so that the image of the round fiber end on the detector row has an elliptical shape, wherein the small minor axis is parallel to the row direction.

In another embodiment of the spectrometer, light from a fiber with a large fiber diameter, for example 200 µm, is first coupled into a plurality of fibers with smaller fiber diameter, for example 50 µm. The light from each fiber with smaller fiber diameter may then be spectrally split and imaged onto a separate detector row or a separate region of a detector row, respectively.

The invention claimed is:

1. An optical measuring device, comprising:
a measuring head comprising imaging optics and an evaluation unit, the measuring head defining a recess,
wherein the measuring head is connected to the evaluation unit by two light-conducting fibers,
wherein the evaluation unit comprises a light source, the light of which is guided into the measuring head through a first light-conducting fiber of the two light-conducting fibers,
wherein light reflected from an object to be measured is guided back through the measuring head and into a second light-conducting fiber of the two light-conducting fibers by means of a beam splitter such that outgoing and return light are separated,
wherein the fiber ends are located in conjugate positions with respect to each other,
wherein the beam splitter and the fiber ends are arranged together in a connector that is separably connected to the measuring head, the connector being positioned within the recess, and
wherein the connector is configured to be detached from the measuring head and then, in the same condition, reattached to the measuring head.

2. The optical measuring device according to claim 1, wherein first and second fiber ends of the fiber ends respectively form confocal apertures.

3. The optical measuring device according to claim 1, wherein the connector comprises at least one aperture arrangement that forms a confocal aperture.

4. The optical measuring device according to claim 3, wherein the at least one aperture arrangement comprises a plurality of sub-apertures.

5. The optical measuring device according to claim 3, wherein the connector comprises a first aperture arrangement and a second aperture arrangement, wherein the first aperture arrangement and the second aperture arrangement are identically configured.

6. The optical measuring device according to claim 1, wherein the optical measuring device measures according to the chromatic-confocal principle.

7. The optical measuring device according to claim 1, wherein the optical measuring device measures according to the spectral interferometric principle.

8. The optical measuring device according to claim 1, wherein the connector is configured such that the fiber ends are positioned relative to the measuring head in a precisely repeatable manner.

9. The optical measuring device according to claim 8, wherein the connector has a cone shape or a truncated cone.

10. The optical measuring device according to claim 1, wherein the connector comprises a protective glass.

11. The optical measuring device according to claim 1, wherein the measuring head is connected to the evaluation unit by at least four light-conducting fibers, wherein the fibers are each arranged in conjugate pairs.

12. The optical measuring device according to claim 1, wherein the beam splitter and/or a protective glass of the device are provided with an anti-reflective coating.

13. The optical measuring device according to claim 1, wherein the evaluation unit comprises a spectrometer that images the measuring light emitted by the second light-conducting fiber spectrally resolved onto a detector row, wherein the imaging is configured to be anamorphic so that the imaging scale in the direction of the detector row differs from the imaging scale orthogonal to the direction of the detector row.

14. The optical measuring device according to claim 8, wherein the fiber ends are positioned relative to the measuring head in a precisely repeatable manner within predetermined tolerances.

15. The optical measuring device according to claim 11, wherein the fibers are each arranged in two lines.

16. The optical measuring device according to claim 1, wherein the connector is detachable from the measuring head and replaceable with a new connector without recalibration of the optical measuring device before operation.

17. The optical measuring device according to claim 1, wherein the connector is located at a defined lateral position with respect to an optical axis of the imaging optics.

18. The optical measuring device according to claim 17, wherein the connector is centered in the recess.

19. The optical measuring device according to claim 1, wherein the first connector is detachable from the measuring head and replaceable with a second connector that maintains the relative positioning of the confocal apertures with respect to the imaging optics.

20. The optical measuring device according to claim 9, wherein the recess is cone-shaped.

* * * * *